(12) United States Patent
Cho et al.

(10) Patent No.: US 10,662,616 B2
(45) Date of Patent: May 26, 2020

(54) CONTROL DEVICE AND CONTROL METHOD FOR CONSTRUCTION MACHINE

(71) Applicant: Doosan Infracore Co., Ltd., Incheon (KR)

(72) Inventors: Lee Hyoung Cho, Gyeonggi-do (KR); Won Sun Sohn, Seoul (KR); Byung Yoon Song, Gyeonggi-do (KR); Jai Seok Bang, Incheon (KR); Min Ha An, Seoul (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 484 days.

(21) Appl. No.: 15/398,279

(22) Filed: Jan. 4, 2017

(65) Prior Publication Data

US 2017/0198458 A1    Jul. 13, 2017

(30) Foreign Application Priority Data

Jan. 7, 2016  (KR) ........................ 10-2016-0001985

(51) Int. Cl.
*E02F 9/20* (2006.01)
*E02F 9/22* (2006.01)
(Continued)

(52) U.S. Cl.
CPC .......... *E02F 9/2066* (2013.01); *E02F 9/2235* (2013.01); *E02F 9/2246* (2013.01);
(Continued)

(58) Field of Classification Search
None
See application file for complete search history.

(56) References Cited

U.S. PATENT DOCUMENTS 6,020,651 A    2/2000 Nakamura et al.
7,269,945 B2 *  9/2007 Bae ........................ E02F 9/2228
                                              60/431

(Continued)

FOREIGN PATENT DOCUMENTS

CN    2108814 A    7/1992
CN    1938484 A    3/2007
(Continued)

OTHER PUBLICATIONS

Chinese Office Action issued in related Chinese Patent Application No. 201710009393.6 dated Nov. 1, 2018.
(Continued)

*Primary Examiner* — Navid Ziaeianmehdizadeh
(74) *Attorney, Agent, or Firm* — K&L Gates LLP

(57) ABSTRACT

The present disclosure relates to a control device and a control method for a construction machine. The control device and the control method for the construction machine according to the exemplary embodiment of the present disclosure may adjust an engine revolutions per minute (rpm) according to a load applied to the construction machine, thereby controlling an output of equipment. In the control device and the control method for the construction machine according to the exemplary embodiment of the present disclosure, an output of a pump is increased at an appropriate time, so that good operation performance may be maintained, and in the case of an operation pattern, in which a load is low, the engine rpm is adjusted to be decreased, thereby improving fuel efficiency.

12 Claims, 4 Drawing Sheets

(51) Int. Cl.
    *F16H 61/42*      (2010.01)
    *F16H 61/465*     (2010.01)
    *F02D 29/02*      (2006.01)
    *F02D 29/04*      (2006.01)
    *F02D 35/00*      (2006.01)

(52) U.S. Cl.
    CPC .......... *E02F 9/2292* (2013.01); *E02F 9/2296* (2013.01); *F02D 29/02* (2013.01); *F02D 29/04* (2013.01); *F02D 35/00* (2013.01); *F16H 61/42* (2013.01); *F16H 61/465* (2013.01); *F15B 2211/20523* (2013.01); *F15B 2211/20546* (2013.01); *F15B 2211/20576* (2013.01); *F15B 2211/275* (2013.01); *F15B 2211/633* (2013.01); *F15B 2211/6309* (2013.01); *F15B 2211/6346* (2013.01); *F15B 2211/6651* (2013.01)

(56) References Cited

U.S. PATENT DOCUMENTS

| | | | |
|---|---|---|---|
| 2007/0193262 A1* | 8/2007 | Iwamoto | B60W 10/06 60/421 |
| 2007/0204604 A1* | 9/2007 | Naruse | E02F 9/2235 60/433 |
| 2007/0227137 A1 | 10/2007 | Naruse | |
| 2010/0332102 A1 | 12/2010 | Akiyama et al. | |
| 2011/0276212 A1* | 11/2011 | Wu | B60L 1/003 701/22 |
| 2015/0176252 A1* | 6/2015 | Kim | B60W 30/1888 701/50 |
| 2015/0252820 A1 | 9/2015 | Sugano et al. | |
| 2016/0061236 A1 | 3/2016 | Tho et al. | |

FOREIGN PATENT DOCUMENTS

| | | |
|---|---|---|
| CN | 1950614 A | 4/2007 |
| EP | 0344420 B1 | 12/1989 |
| EP | 1207304 | 5/2002 |
| KR | 10-2010-0100964 A | 9/2010 |
| WO | 2014148855 | 9/2014 |

OTHER PUBLICATIONS

Extended European Search Report issued in corresponding European Patent Application No. 17150383.2 dated Jun. 1, 2017.

\* cited by examiner

CONTROL DEVICE AND CONTROL METHOD FOR CONSTRUCTION MACHINE

PRIORITY STATEMENT

This application claims priority under 35 U.S.C. § 119 to Korean Patent Application No. 10-2016-0001985, filed on Jan. 7, 2016, in the Korean Intellectual Property Office, the disclosure of which is incorporated herein in its entirety by reference.

FIELD OF TECHNOLOGY

The present disclosure relates to a control device and a control method for a construction machine, which are capable of controlling an output of equipment by adjusting the revolutions per minute of an engine according to the load applied to a construction machine.

BACKGROUND

In general, a construction machine includes an engine and a hydraulic system. The engine outputs power.

The hydraulic system may include a joystick, a pump, a main control valve, and an actuator.

The joystick may be manipulated according to an intention of an operator, and a pilot signal is generated by the amount of manipulated displacement.

The pump is operated by the power, so that high pressure working fluid is discharged, and the working fluid is provided to the main control valve. In the meantime, the plurality of hydraulic pumps may be provided.

The main control valve includes a plurality of valve units, and each of the valve units includes a spool. Further, each valve unit is connected with a specific actuator. Further, in each valve unit, the spool may be moved according to the pilot signal. When the spool is moved, a flow path is opened and the high pressure working fluid is provided to a specific actuator, so that the actuator is operated to enable an operator to perform desired work.

The actuator may include a left travelling motor and a right travelling motor for travelling of the construction machine, a swing motor for swinging an upper body, a boom cylinder for moving a boom up or down, an arm cylinder for dumping or clouding an arm, and a bucket cylinder for dumping or clouding a bucket.

The construction machine having the aforementioned configuration may be controlled as described below.

An operator manipulates a corresponding joystick in order to operate the desired actuator. When the joystick is manipulated, a pilot signal is generated. The pilot signal is provided to a pressure receiving unit of a specific spool provided in the main control valve. The spool is moved according to the pilot signal, and thus high pressure working fluid is provided to the specific actuator.

A loading operation among the operations of the construction machine will be described as an example. The loading operation may include a digging pattern, a boom up and swing pattern, an only swing pattern, a dump pattern, and a boom descending and swing pattern.

The digging pattern is a process of putting an operation target into a bucket, in which the bucket and the arm may be clouded. Further, a load may be increased in the digging pattern.

In the boom up and swing pattern, the boom may be ascended and the upper body may swing in the state where the operation target is put into the bucket. Further, a load may be greatly applied in the boom up and swing pattern.

In the only swing pattern, the upper body may swing in the state where the boom is maintained in the up state. Further, a load may be minimized in the only swing pattern.

In the dump pattern, the operation target put into the bucket may be put out by dumping the bucket. A general load, which is not large and is not small, may be applied in the dump pattern.

In the boom down and swing pattern, the boom is returned for the digging, and the boom may be descended and the upper body may reversely swing. In the boom down and swing pattern, a low load is applied.

In the meantime, in a control device and a control method for a construction machine in the related art, a capacity of a pump is determined in order to implement a required operation speed of the actuator regardless of a load. Because of this, a demand of the operator is matched with an operation speed of each actuator provided in the construction machine.

Accordingly, a final engine rpm is determined by adding mapping of the capacity of the pump and the engine rpm, and mapping considering each operation pattern of the operator.

However, the control device and the control method for the construction machine in the related art have problems as described below.

In the control device and the control method for the construction machine in the related art, an output of the pump is changed based on a flow rate to be discharged from the pump and each operation pattern, so that an adjustment of the engine rpm according to a change in a load is limited.

This will be described in more detail with reference to FIG. 1. FIG. 1 is a diagram for describing a change in the engine rpm according to a time when a loading operation is performed by the control device and the control method for the construction machine in the related art.

In a digging pattern, in which digging is performed, the target engine rpm may be uniform. However, the digging pattern is a process in which digging is actually performed, and a heavy load is applied, but the engine rpm is uniform, so that an output of the pump may be short. Particularly, when the output of the pump is short, there is a problem in that operation performance deteriorates.

In the meantime, in the dump pattern, the dump pattern is recognized as other patterns, so that the engine rpm is maximized That is, in the dump pattern, even though a load is not greatly applied, the large output of the pump may be output. Accordingly, in a method of controlling an excavator in the related art, fuel may be wasted in the dump pattern.

On the other hand, in the boom down and swing pattern, it is determined that a load is low, so that the engine rpm may be set to be excessively low. Accordingly, in the method of controlling the excavator in the related art, the output of the pump is low, so that a reverse swing speed is excessively low when the upper body reversely swings.

Accordingly, the control device and the control method for the construction machine in the related art may control the engine rpm so that the engine rpm may be adjusted according to a variation of a load, but when it is necessary to increase the output of the pump or the output of the pump may be decreased, the engine rpm fails to be appropriately set, so that the output of the pump is low, fuel efficiency is degraded, or an operation speed of the specific actuator is remarkably decreased.

RELATED ART LITERATURE

Patent Document

Korean Patent Application Laid-Open No. 10-2010-0100964 (Sep. 15, 2010)

SUMMARY

The present disclosure has been made in an effort to provide a control device and a control method for a construction machine, in which an output of equipment is appropriately adjusted according to a current load of the equipment and a demand of a driver, so that the revolutions per minute (rpm) of an engine is increased in an operation pattern, in which a load is large, and the revolutions per minute (rpm) of the engine is decreased in an operation pattern, in which a load is small, thereby improving fuel efficiency.

An exemplary embodiment of the present disclosure provides a device for controlling a construction machine, the device including: a required output calculating unit 20 configured to receive a value of a pump discharged pressure currently discharged from a pump and a flow rate value required by a driver, and calculate a required output based on the value of the pump discharged pressure and the flow rate value required by the driver; a revolutions per minute (rpm) decreased amount calculating unit 30 configured to calculate the amount of increase/decrease of an engine rpm based on the required output; a processing unit 40 configured to receive the amount of increase/decrease of the engine rpm and a current rated engine rpm and calculate a target engine rpm based on the amount of increase/decrease of the engine rpm and the rated engine rpm; and an engine rpm output unit 70 configured to output the target engine rpm and to make the engine be controlled based on the target engine rpm.

The device may further include a slope limiting unit 50 configured to control a speed, which is reflected when the target engine rpm is reflected from the current engine rpm, based on a predetermined slope before the target engine rpm is output from the engine rpm output unit 70.

The predetermined slope may be set to be steep when the engine rpm is increased.

The required output may be calculated by multiplying a value ($\Sigma\ P_p$) obtained by summing pump discharged pressure values ($P_p$) of all of the pumps, from which working fluid is discharged, and a reciprocal number ($1/\Sigma\ P_{Ne}$) of a value obtained by summing all of the negacon pressure values ($P_{Ne}$).

The required output may be calculated as a value ($\Sigma\ (P_{current} \times Q_a)$) obtained by summing values obtained by multiplying a current discharged pressure value ($P_{current}$) of each pump and a discharged flow rate ($Q_a$) according to an actual position of a swash plate of each pump.

The rpm decreased amount calculating unit 30 may adjust the amount of increase/decrease of the engine rpm to be an inverse proportion to an output of the pump.

The rpm decreased amount calculating unit 30 may adjust the amount of increase/decrease of the engine rpm within a range of a maximum engine rpm difference value or less of equipment when the equipment starts an operation and is changed to be in a high load state.

When a swing of an upper body is included in an operation pattern, the amount of increase/decrease of the engine rpm may be adjusted within a range securing a swing speed.

When a pressure of a negacon connected with a swing motor is 9 bars to 11 bars, it may be determined that the swing of the upper body is included in the operation pattern.

Another exemplary embodiment of the present disclosure provides a method of controlling a construction machine, the method including: calculating a required output based on a value of a pump discharged pressure currently discharged from a pump and a flow rate value required by a driver; calculating the amount of increase/decrease of revolutions per minute (rpm) of an engine based on the required output; calculating a target engine rpm based on the amount of increase/decrease of the engine rpm and a current rated engine rpm; and outputting the target engine rpm and controlling the engine based on the target engine rpm.

The method may further include, before the target engine rpm is output, controlling a speed, which is reflected when the target engine rpm is reflected from a current engine rpm, based on a predetermined slope.

The predetermined slope may be set to be steep when the engine rpm is increased.

The required output may be calculated by multiplying a value ($\Sigma\ P_p$) obtained by summing pump discharged pressure values ($P_p$) of all of the pumps, from which working fluid is discharged, and a reciprocal number ($1/\Sigma\ P_{Ne}$) of a value obtained by summing all of the negacon pressure values ($P_{Ne}$).

The required output may be calculated as a value ($\Sigma\ (P_{current} \times Q_a)$) obtained by summing values obtained by multiplying a current discharged pressure value ($P_{current}$) of each pump and a discharged flow rate ($Q_a$) according to an actual position of a swash plate of each pump.

The amount of increase/decrease of the engine rpm may be adjusted to be in inverse proportion to an output of the pump.

When the equipment starts an operation and is changed to be in a high load state, the amount of increase/decrease of the engine rpm may be adjusted within a range of a maximum engine rpm difference value or less of equipment.

When a swing of an upper body is included in an operation pattern, the amount of increase/decrease of the rpm of the engine may be adjusted within a range securing a swing speed.

When a pressure of a negacon connected with a swing motor is 9 bars to 11 bars, it may be determined that the swing of the upper body is included in the operation pattern.

Other detailed matters of the exemplary embodiments are included in the detailed description and the drawings.

According to the exemplary embodiments of the present disclosure, the control device and the control method for the construction machine may increase the engine rpm in an operation pattern, in which a heavy load is applied, so that it is possible to maintain good operation performance, and the control device and the control method for the construction machine according to the exemplary embodiment of the present disclosure may decrease the engine rpm in the operation pattern, in which a low load is applied, so that it is possible to improve fuel efficiency.

According to the exemplary embodiments of the present disclosure, the control device and the control method for the construction machine may rapidly respond to a demand of an operator or a load applied to the construction machine when an output of the pump is desired to be changed according to the demand of the operator.

Particularly, according to the exemplary embodiments of the present disclosure, the control device and the control method for the construction machine may continuously adjust a target rpm of the engine according to a load when the excavation is performed, thereby maintaining good operation performance.

According to the exemplary embodiments of the present disclosure, the control device and the control method for the construction machine may set the rpm of the engine appropriate to a load and a request when dumping is performed, thereby improving fuel efficiency.

According to the exemplary embodiments of the present disclosure, the control device and the control method for the construction machine may prevent a swing speed from being excessively decreased when the swing operation for swinging the upper body is performed, thereby stably implementing an appropriate speed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
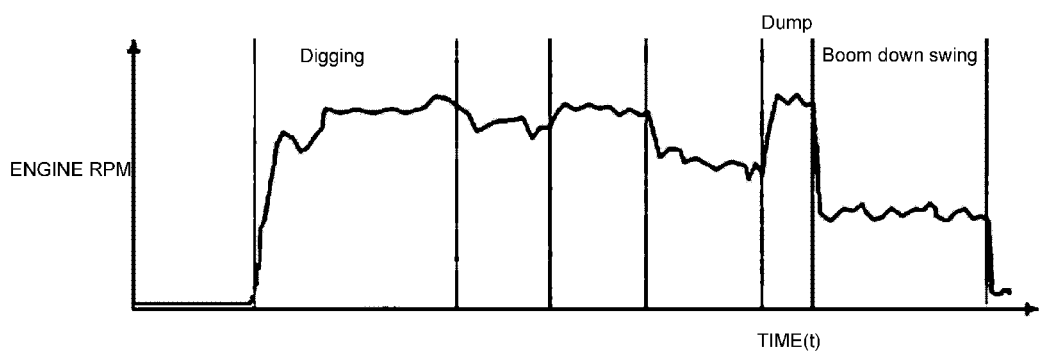
FIG. 1 is a diagram for describing a change in revolutions per minute (rpm) of an engine according to a time when a loading operation is performed by a control device and a control method for a construction machine in the related art.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to exemplary embodiments described in detail below together with the accompanying drawings.

Hereinafter, an exemplary embodiment of the present disclosure will be described in detail with reference to the accompanying drawings. It should be appreciated that the exemplary embodiment, which will be described below, is illustratively described for helping to understand the present disclosure, and the present disclosure may be variously modified to be carried out differently from the exemplary embodiment described herein. In the following description of the exemplary embodiment, a detailed description of known configurations or functions incorporated herein will be omitted when it is determined that the detailed description may make the subject matter of the present disclosure unclear. Further, the accompanying drawings are not illustrated according to an actual scale, but sizes of some constituent elements may be exaggerated to help understand the present disclosure.

Terms "first", "second", and the like may be used for describing various constituent elements, but the constituent elements should not be limited to the terms. The above terms are used only to discriminate one component from another component. For example, a first element could be termed a second element, and similarly, a second element could be also termed a first element without departing from the scope of the present disclosure.

The terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

Figure 2:
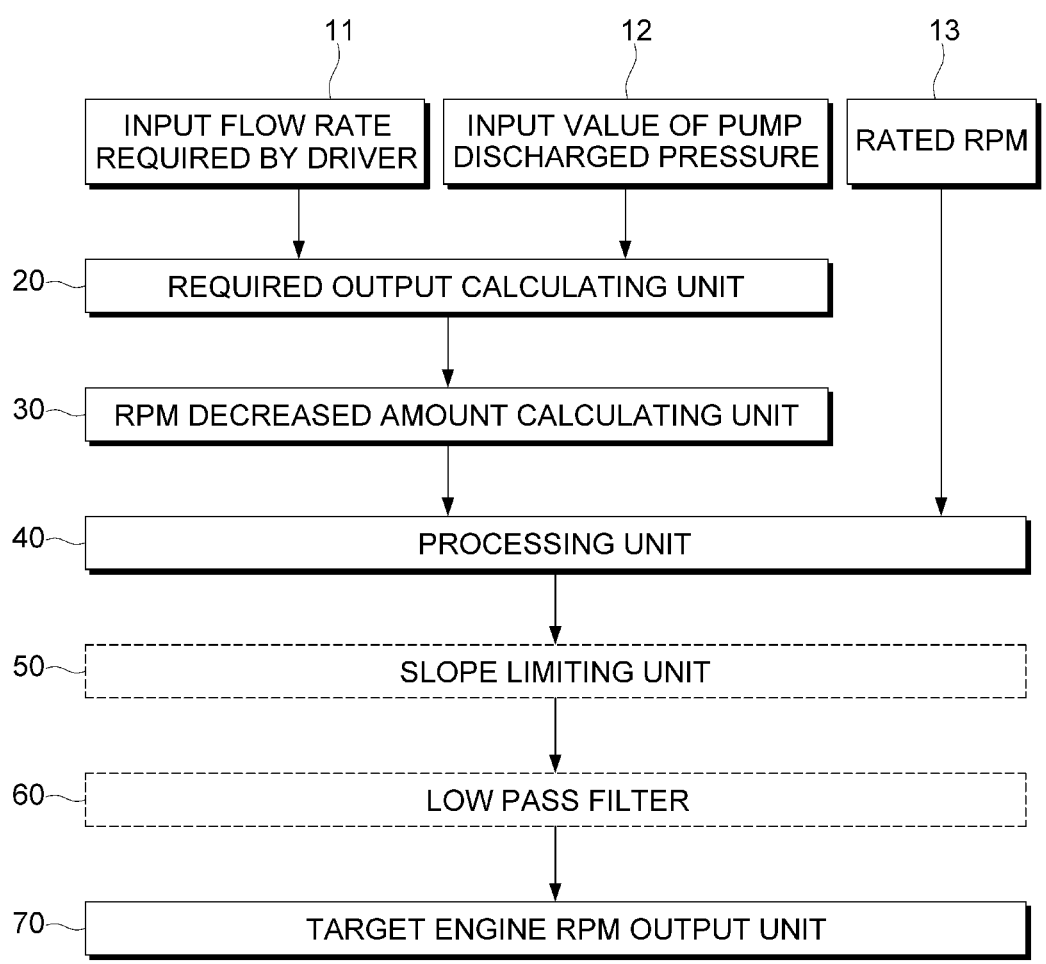
FIG. 2 is a diagram for describing a control device and a control method for a construction machine according to an exemplary embodiment of the present disclosure.
Figure 3:
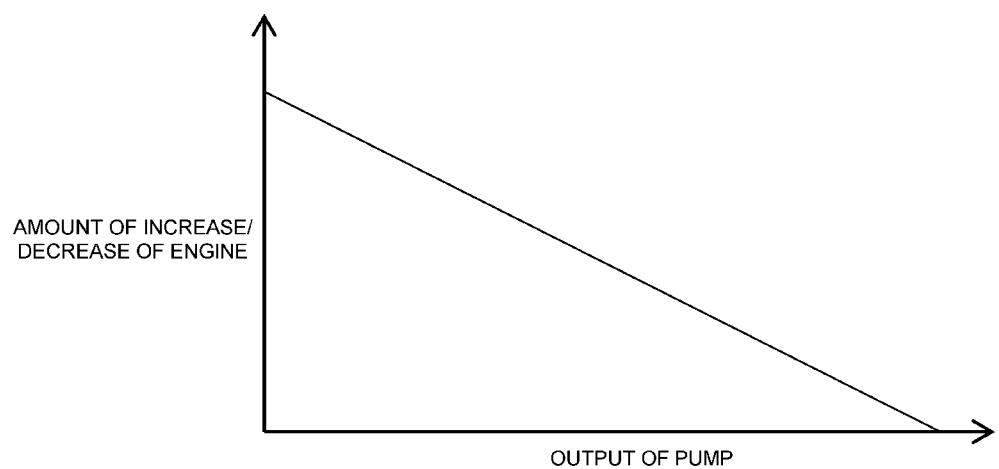
FIG. 3 is a diagram for describing a correlation between the amount of increase/decrease of the engine rpm and an output of a pump in the control device and the control method for the construction machine according to the exemplary embodiment of the present disclosure.
Figure 4:
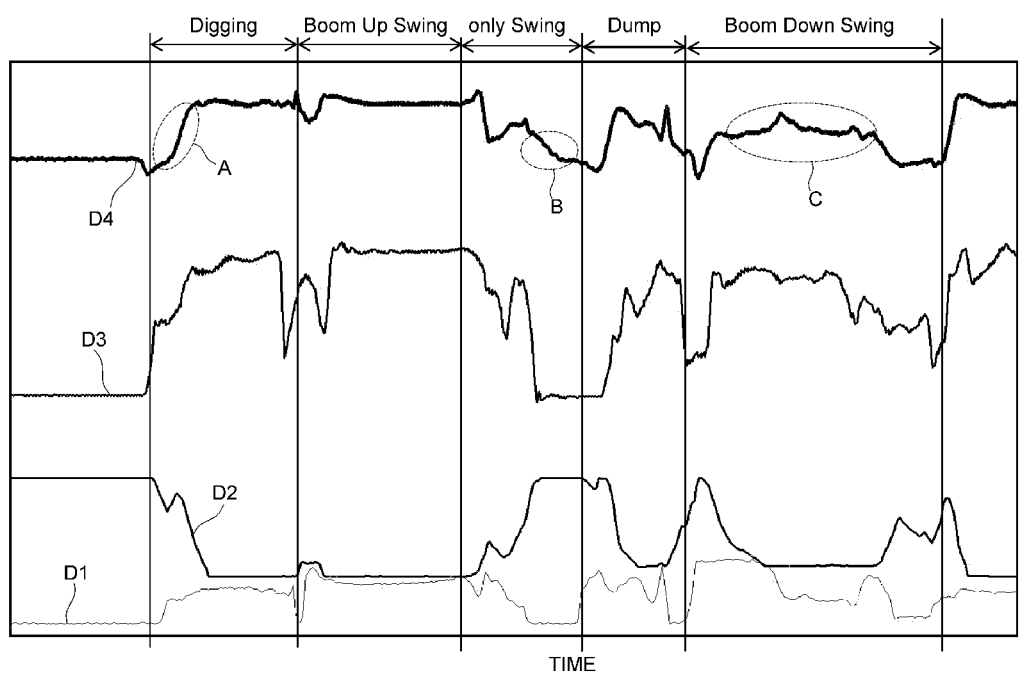
FIG. 4 is a diagram for describing changes in the engine rpm, a required output, a flow rate required by a driver, and a pressure of the pump according to a time when a loading operation is performed by the control device and the control method for the construction machine according to the exemplary embodiment of the present disclosure.

Hereinafter, a control device and a control method for a construction machine according to an exemplary embodiment of the present disclosure will be described with reference to FIGS. 2 to 4. FIG. 2 is a diagram for describing a control device and a control method for a construction machine according to an exemplary embodiment of the present disclosure. FIG. 3 is a diagram for describing a correlation between the amount of increase/decrease of revolutions per minute (rpm) of an engine and an output of a pump in the control device and the control method for the construction machine according to the exemplary embodiment of the present disclosure. FIG. 4 is a diagram for describing changes in the engine rpm, a required output, a flow rate required by a driver, and a pressure of the pump according to a time when a loading operation is performed by the control device and the control method for the construction machine according to the exemplary embodiment of the present disclosure.

The control device for the construction machine according to the exemplary embodiment of the present disclosure may include a required output calculating unit 20, an rpm decreased amount calculating unit 30, a processing unit 40 and a target engine rpm output unit 70.

The required output calculating unit 20 receives a flow rate required by a driver and a pump discharged pressure value currently discharged from the pump (11 and 12), and calculates a required output based on the flow rate required by the driver and the pump discharged pressure value.

The rpm decreased amount calculating unit 30 calculates the amount of increase/decrease of the engine rpm based on the required output.

The processing unit 40 receives the amount of increase/decrease of the engine rpm and a current rated engine rpm, and calculates a target engine rpm based on the amount of increase/decrease of the engine rpm and the rated engine rpm.

The engine rpm output unit 70 outputs the target engine rpm and enables the engine to be controlled based on the target engine rpm.

The control device and the control method for the construction machine according to the exemplary embodiment of the present disclosure including the aforementioned configuration will be described with reference to FIG. 4. In FIG. 4, D1 represents a pump pressure value according to a time, D2 represents a flow rate required by a driver according to a time, D3 represents a required output according to a time, and D4 represents the engine rpm according to a time.

In a digging pattern, the engine rpm is increased as indicated in portion "A". That is, the engine rpm is rapidly increased at an initial state, at which a high load is applied to the construction machine, so that good operation performance may be maintained.

In the control device and the control method for the construction machine according to the exemplary embodiment of the present disclosure including the aforementioned configuration, in an only swing pattern, the engine rpm may be decreased as indicated in portion "B". That is, in the control device and the control method for the construction machine according to the exemplary embodiment of the present disclosure including the aforementioned configuration, when a low load is applied to the construction machine, the engine rpm is remarkably decreased, thereby improving fuel efficiency.

In the control device and the control method for the construction machine according to the exemplary embodiment of the present disclosure including the aforementioned configuration, in a boom down swing pattern, the state where the engine rpm is increased may be maintained as indicated in portion "C". That is, in the control device and the control method for the construction machine according to the exemplary embodiment of the present disclosure including the aforementioned configuration, the engine rpm is increased particularly when a complex operation including the swing of an upper body is required, thereby preventing the speed of the swing of the upper body from being decreased.

In the meantime, in the control device and the control method for the construction machine according to the exemplary embodiment of the present disclosure including the aforementioned configuration, a slope limiting unit 50 may be further included.

The slope limiting unit 50 may control a speed, which is reflected when the target engine rpm is reflected from the current engine rpm, based on a predetermined slope before the target engine rpm is output from the engine rpm output unit 70.

The predetermined slope may be controlled so that when the output of the pump is small, the amount of increase/decrease of the engine rpm is large, and when the output of the pump is large, the amount of increase/decrease of the engine rpm is small as represented in FIG. 3. That is, the amount of increase/decrease of the engine rpm may be adjusted to be in inverse proportion to the output of the pump. Herein, the amount of increase/decrease of the engine rpm means the amount of increase of the engine rpm when the engine rpm is increased, and the amount of decrease of the engine rpm when the engine rpm is decreased. For example, in the case of the amount of decrease of the engine rpm, the engine rpm may be adjusted to be in inverse proportion to the output of the pump from the amount of decrease of a maximum of 200 rpm to the amount of decrease of 0 rpm according to the output of the pump.

In the digging pattern, in which the output of the pump is exceedingly increased from a small state, that is, a low load state is changed to a high load state, as represented in portion "A" of FIG. 4, the amount of decrease of the engine rpm is adjusted from a large state to a small state, so that the speed of the increase of the engine rpm is increased in portion "A" of FIG. 4. Portion "B" of FIG. 4 represents an only swing pattern in which the output of the pump is small, and is a section, in which a load state is changed to the low load state, and the amount of decrease of the engine rpm is adjusted to be in a large state, so that the engine rpm is decreased. Portion "C" of FIG. 4 represents a boom down and swing pattern in which in order to secure a swing speed, the engine rpm is adjusted within the range of the amount of decrease of the engine rpm from 100 rpm to 0 rpm.

Accordingly, in the control device and the control method for the construction machine according to the exemplary embodiment of the present disclosure, the current output of the pump is reflected in real time when a required output is calculated, and an operation capability currently implemented in the construction machine may be more actively and rapidly reflected to the target engine rpm that is to be finally output.

On the other hand, in the control device and the control method for the construction machine according to the exemplary embodiment of the present disclosure, a low pass filter 60 may be further included.

The low pass filter 60 enables the target engine rpm to be linearly and continuously output before the target engine rpm is output from the engine rpm output unit 70.

Accordingly, in the control device and the control method for the construction machine according to the exemplary embodiment of the present disclosure, the engine rpm may be continuously and smoothly adjusted without being suddenly changed when the engine rpm is adjusted.

On the other hand, in the control device and the control method for the construction machine according to the exemplary embodiment of the present disclosure, the required output calculating unit 20 calculates a required output of the driver. In the case of negacon equipment, the required output is calculated by multiplying a value ($\Sigma$ Pp) obtained by summing pump discharged pressure values Pp of all of the pumps, from which working fluid is discharged, and a reciprocal number (1/$\Sigma$ PNe) of a value obtained by summing all of the negacon pressure values PNe.

Accordingly, in the control device and the control method for the construction machine according to the exemplary embodiment of the present disclosure, the discharged pressures of all of the pumps and the negacon pressure are reflected in real time when a required output is calculated, so that the load currently applied to the construction machine may be more actively and rapidly reflected to a target engine rpm that is to be finally output.

On the other hand, in the case of an electronic control pump, the required output is calculated with a value ($\Sigma$ (Pcurrent×Qa)) obtained by summing the values obtained by multiplying a discharged flow rate Qa according to an actual position of a swash plate of each pump to a current discharged pressure value Pcurrent of each pump. Here, a value of the required flow rate of the driver is reflected to a value of the position of the swash plate of the electronic control pump.

Accordingly, in the control device and the control method for the construction machine according to the exemplary embodiment of the present disclosure, the current pump discharged pressures of all of the pumps and the discharged flow rate according to the actual position of the swash plate are reflected in real time when a required output is calculated, so that the load currently applied to the construction machine may be more actively and rapidly reflected to a target engine rpm which is to be finally output.

On the other hand, in the control device and the control method for the construction machine according to the exemplary embodiment of the present disclosure, the amount of increase/decrease of the engine rpm may be within the range of 0 rpm to 200 rpm. Herein, when the engine rpm is decreased, the amount of increase/decrease of the engine rpm is the amount of decrease of the engine rpm, and the amount of decrease of the engine rpm is within the range of 200 rpm to 0 rpm.

Accordingly, in the control device and the control method for the construction machine according to the exemplary embodiment of the present disclosure, the range of the amount of increase/decrease of the engine rpm is wide, so that it is possible to more broadly decrease the engine rpm, and further improve fuel efficiency.

On the other hand, in the control device and the control method for the construction machine according to the exemplary embodiment of the present disclosure, when the swing of the upper body is included in the operation pattern, the amount of increase/decrease of the engine rpm may be within the range of 0 rpm to 100 rpm. Herein, when the engine rpm is decreased, the amount of increase/decrease of the engine rpm is the amount of decrease of the engine rpm, and the amount of decrease of the engine rpm is within the range of 100 rpm to 0 rpm.

Accordingly, in the control device and the control method for the construction machine according to the exemplary embodiment of the present disclosure, when the complex operation including the swing of the upper body is required, the range of the decrease of the engine rpm is relatively narrower compared to those of other operation patterns, so that when the amount of decrease, by which the engine rpm is decreased, is reached, it is possible to maintain the good engine rpm. Particularly, the good engine rpm is maintained, so that in the case of the boom down swing pattern, the good swing speed of the upper body may be maintained.

On the other hand, in the control device and the control method for the construction machine according to the exemplary embodiment of the present disclosure, when the pressure of the negacon connected with a swing motor is 9 bars to 11 bars, it may be determined that the swing of the upper body is included in the operation pattern.

That is, when the swing motor and the boom cylinder consume working fluid, the pressure of the negacon connected with the swing motor may be decreased. More particularly, the pressure of the negacon may be formed with 9 bars to 11 bars.

Accordingly, in the control device and the control method for the construction machine according to the exemplary embodiment of the present disclosure, when the pressure of the negacon connected with the swing motor is 9 bars to 11 bars, it is determined that the swing of the upper body is included in the operation pattern, so that the engine rpm may be controlled to be decreased within the range from 0 rpm to 100 rpm.

Accordingly, the control device and the control method for the construction machine according to the exemplary embodiment of the present disclosure may rapidly increase the engine rpm in the operation pattern, in which a heavy load is applied, so that it is possible to maintain good operation performance, and the control device and the control method for the construction machine according to the exemplary embodiment of the present disclosure may rapidly decrease the engine rpm in the operation pattern, in which a low load is applied, so that it is possible to improve fuel efficiency.

The control device and the control method for the construction machine according to the exemplary embodiment of the present disclosure may rapidly respond to a demand of an operator or a load applied to the construction machine when an output of the pump is desired to be changed according to the demand of the operator.

Particularly, the control device and the control method for the construction machine according to the exemplary embodiment of the present disclosure may continuously adjust a target engine rpm according to a load when the excavation is performed, thereby maintaining good operation performance.

The control device and the control method for the construction machine according to the exemplary embodiment of the present disclosure may set the engine rpm appropriate to a load and a request when dumping is performed, thereby improving fuel efficiency.

The control device and the control method for the construction machine according to the exemplary embodiment of the present disclosure may prevent a swing speed from being excessively decreased when the swing operation for swinging the upper body is performed, thereby stably implementing an appropriate speed.

The control device and the control method for the construction machine according to the exemplary embodiment of the present disclosure may adjust the engine rpm according to a load applied to the construction machine, thereby controlling an output of equipment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A device for controlling a construction machine, the device comprising:
   a required output calculating unit configured to receive a value of a pump discharged pressure discharged from one or more pumps and a flow rate value required by a driver, and calculate a required output based on the value of the pump discharged pressure and the flow rate value required by the driver;
   a revolutions per minute (rpm) decreased amount calculating unit configured to calculate an amount of increase/decrease of an engine rpm based on the required output;
   a processing unit configured to receive the amount of increase/decrease of the engine rpm and a current rated engine rpm and calculate a target engine rpm based on the amount of increase/decrease of the engine rpm and the current rated engine rpm; and
   an engine rpm output unit configured to output the target engine rpm and control the engine based on the target engine rpm,
   wherein the required output is calculated by any one of a first method and a second method according to a control method of the construction machine,
   wherein the first method calculates the required output based on the following formula:

$$\Sigma Pp \times 1/\Sigma P_{Ne}.$$

wherein $\Sigma Pp$ is a value obtained by summing the pump discharged pressure value (Pp) of the one or more pumps, from which working fluid is discharged, and $\Sigma P_{Ne}$ is a value obtained by summing negacon pressure values ($P_{Ne}$), and
   wherein the second method calculates the required output as a value ($\Sigma$ (Pcurrent×Qa)) obtained by summing values obtained by multiplying a current discharged pressure value (Pcurrent) of each of the one or more pumps and a discharged flow rate (Qa) according to an actual position of a swash plate of each of the one or more pumps.

2. The device of claim 1, further comprising:
a slope limiting unit configured to control a speed, when the target engine rpm is changing from the current rated engine rpm, based on a predetermined slope before the target engine rpm is output from the engine rpm output unit.

3. The device of claim 1, wherein the rpm decreased amount calculating unit adjusts the amount of increase/decrease of the engine rpm to be in inverse proportion to an output of the one or more pumps.

4. The device of claim 1, wherein the rpm decreased amount calculating unit adjusts the amount of increase/decrease of the engine rpm within a range of a maximum engine rpm difference value when the equipment starts an operation and is changed to be in a high load state.

5. The device of claim 4, wherein when a swing of an upper body is included in an operation pattern, the amount of increase/decrease of the engine rpm is adjusted within a range securing a swing speed.

6. The device of claim 5, wherein when a pressure of a negacon connected with a swing motor is 9 bars to 11 bars, it is determined that the swing of the upper body is included in the operation pattern.

7. A method of controlling a construction machine, the method comprising:
calculating a required output based on a value of a pump discharged pressure discharged from one or more pumps and a flow rate value required by a driver;
calculating an amount of increase/decrease of revolutions per minute (rpm) of an engine based on the required output;
calculating a target engine rpm based on the amount of increase/decrease of the engine rpm and a current rated engine rpm; and
outputting the target engine rpm and controlling the engine based on the target engine rpm,
wherein the required output is calculated by any one of a first method and a second method according to a control method of the construction machine,
wherein the first method calculates the required output based on the following formula:
$\Sigma Pp \times 1/\Sigma P_{Ne}$.
wherein $\Sigma Pp$ is a value obtained by summing the pump discharged pressure value (Pp) of the one or more pumps, from which working fluid is discharged, and $\Sigma P_{Ne}$ is a value obtained by summing negacon pressure values ($P_{Ne}$), and
wherein the second method calculates the required output as a value ($\Sigma$ (Pcurrent×Qa)) obtained by summing values obtained by multiplying a current discharged pressure value (Pcurrent) of each of the one or more pumps and a discharged flow rate (Qa) according to an actual position of a swash plate of each of the one or more pumps.

8. The method of claim 7, further comprising:
before the target engine rpm is output, controlling a speed, when the target engine rpm is changing from the current rated engine rpm, based on a predetermined slope.

9. The method of claim 7, wherein the amount of increase/decrease of the engine rpm is adjusted to be in inverse proportion to an output of the one or more pumps.

10. The method of claim 7, wherein when the equipment starts an operation and is changed to be in a high load state, the amount of increase/decrease of the engine rpm is adjusted within a range of a maximum engine rpm difference value.

11. The method of claim 10, wherein when a swing of an upper body is included in an operation pattern, the amount of increase/decrease of the rpm of the engine is adjusted within a range securing a swing speed.

12. The method of claim 11, wherein when a pressure of a negacon connected with a swing motor is 9 bars to 11 bars, it is determined that the swing of the upper body is included in the operation pattern.

* * * * *